May 6, 1958
H. H. ABELEW
2,834,003
SIGNAL SELECTOR DEVICE
Filed March 18, 1954
5 Sheets-Sheet 1
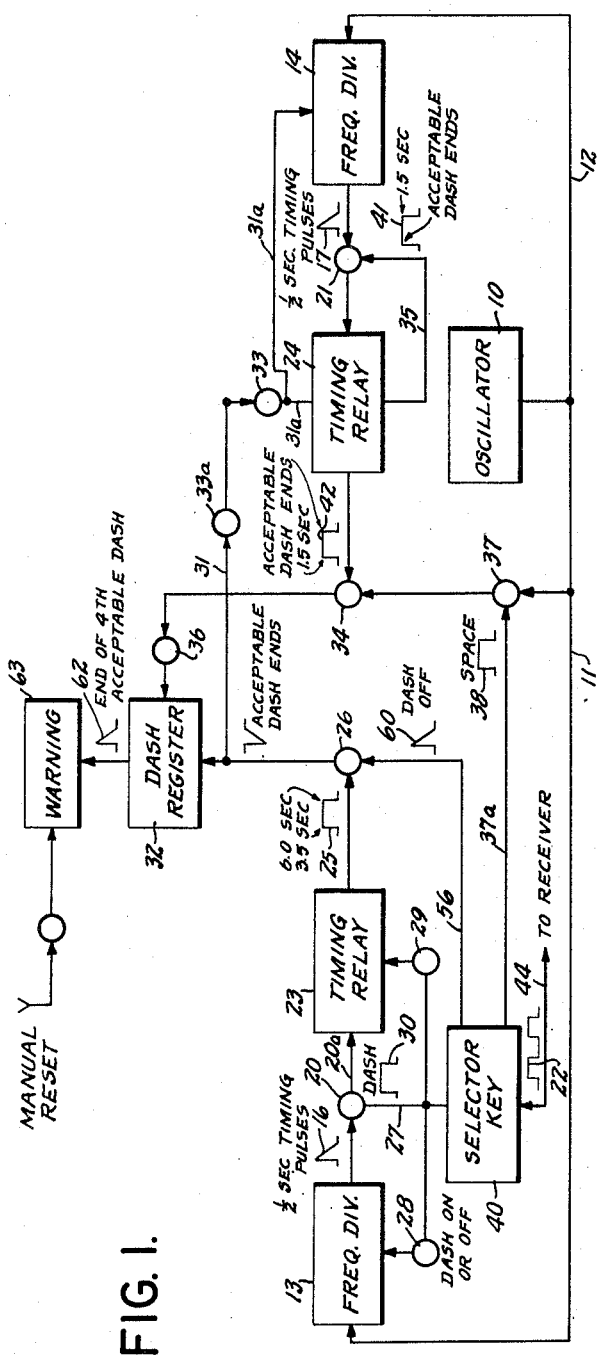
FIG. 1.
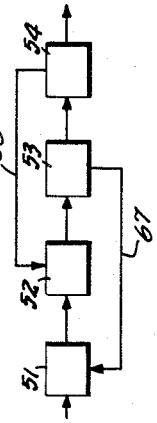
FIG. 2.
FIG. 3.
INVENTOR.
*H. H. ABELEW*
BY
*R. D. Miller*
ATTORNEY

INVENTOR
*H. H. ABELEW*
BY
ATTORNEY

INVENTOR
*H. H. ABELEW*
BY
ATTORNEY

May 6, 1958  H. H. ABELEW  2,834,003
SIGNAL SELECTOR DEVICE
Filed March 18, 1954  5 Sheets-Sheet 5

FIG. 6A.

| DASH TIMING RELAY 32 | M | | N | | O | | P | |
|---|---|---|---|---|---|---|---|---|
| | L | R | L | R | L | R | L | R |
| NORMAL CONDITION | O | × | O | × | O | × | O | × |
| PULSE #1 | × | O | O | × | O | × | O | × |
| PULSE #2 | O | × | × | O | O | × | O | × |
| PULSE #3 | × | O | × | O | O | × | O | × |
| PULSE #4 | O | × | O | × | × | O | O | × |
| — | × | O | O | × | × | O | O | × |
| PULSE #5 | O | × | × | O | × | O | O | × |
| PULSE #6 | × | O | × | O | × | O | O | × |
| PULSE #7 | O | × | O | × | O | × | × | O |
| — | O | × | × | O | O | × | × | O |
| PULSE #8 | × | O | × | O | O | × | × | O |
| PULSE #9 | O | × | O | × | × | O | × | O |
| — | × | O | O | × | × | O | × | O |
| PULSE #10 | O | × | × | O | × | O | × | O |
| PULSE #11 | × | O | × | O | × | O | × | O |
| PULSE #12 | O | × | O | × | O | × | O | × |

PULSE #7 → OPENS GATE 26
PULSE #12 → CLOSES GATE 26

INTERLOCK BETWEEN STAGES O-M AND P-N

O INDICATES NON-CONDUCTING STATE
× INDICATES CONDUCTING STATE

FIG. 6B

| SPACE TIMING RELAY 24 | T | | U | | V | | W | |
|---|---|---|---|---|---|---|---|---|
| | L | R | L | R | L | R | L | R |
| NORMAL CONDITION | O | × | O | × | O | × | O | × |
| PULSE #1 | × | O | O | × | O | × | O | × |
| PULSE #2 | O | × | × | O | O | × | O | × |
| — | × | O | × | O | O | × | O | × |
| PULSE #3 | O | × | O | × | × | O | × | O |

41 OPENS GATE 21
42 OPENS GATE 24

O INDICATES NON-CONDUCTING STATE
× INDICATES CONDUCTING STATE
INTERLOCK BETWEEN STAGES T-U

INVENTOR
H. H. ABELEW
BY
ATTORNEY

United States Patent Office 2,834,003
Patented May 6, 1958

2,834,003

SIGNAL SELECTOR DEVICE

Harry Hugo Abelew, Brooklyn, N. Y., assignor to Mackay Radio and Telegraph Company, New York, N. Y., a company of Delaware Application March 18, 1954, Serial No. 416,981

7 Claims. (Cl. 340—164)

This invention relates generally to improvements in signal selecting apparatus adapted to discriminate between a certain type of signals and all other signals not of that type.

This is a continuation-in-part of applicant's co-pending application, Serial No. 254,121, filed October 31, 1951, entitled "Signal Selector Device."

A primary purpose of the invention resides in the provision of an improved selector apparatus particularly adapted for use as a selector of automatic alarm signals currently comprising, for example, a series of dashes, four seconds in duration and separated by one second intervals. Such a signal has been internationally adopted for actuation of automatic alarm systems for marine use to eliminate the necessity of an operator remaining on continuous duty for detection of radioed distress signals. Selectors currently employed in connection with systems of this type are electro-mechanical in nature and are adapted to operate through a range for acceptance of dashes 3.5 to 6 seconds long, separated by time intervals of from .1 to 1.5 seconds. Upon reception of, for example, three or four consecutive accepted dashes, the selector actuates a warning circuit, and any combination of static or other electrical interference which does not in effect constitute a signal falling within the limits of tolerances prescribed for the auto alarm signal, does not operate to actuate the warning circuit. One type of such an electro-mechanical system is disclosed in U. S. Patent 2,235,804 to Macalpine.

Certain inherent disadvantages reside in the electro-mechanical type of automatic alarm selectors, due, for example, to mechanical inertia and to the time lags associated with electro-magnetic coils employed therein, such time lags being commonly of the order of several milliseconds. Specifications for auto-alarm systems are drafted by international conventions and substantial reductions of allowed tolerances are currently under consideration. Proposed specifications, now agreed upon, impose great difficulties in respect to the design of electro-mechanical equipment for operation within defined tolerances.

Therefore, an important object of the present invention is to provide an automatic alarm selector device wherein electron devices are employed with a periodic circuit of negligible Q for suitable reduction of the response time of the selector.

A still further object is to provide an improved circuit of this type utilizing standard stock components and which does not require components selected for a specific electrical magnitude.

Another object is to provide an improved apparatus, the operation of which may be readily checked by visual inspection of indicating devices, and which may be easily maintained in proper operating condition.

A still further object resides in the simplification of adjustment controls in discriminator type alarm signal selector apparatus, a single control being employed for variation in the timing of the dashes as well as spaces of signals to be accepted, eliminating the need of independent adjustments in timing, thereby obviating one source of timing errors.

Another object of the invention is to provide an improved automatic alarm selector apparatus suitable for employment of counter tubes of the cold cathode type to effect simplification of the circuitry and reduction in the number of required components.

Another object of the invention is to improve and simplify automatic alarm selector apparatus for one or more of the purposes above mentioned. Other objects will readily become apparent to persons skilled in the art upon examination of the drawings, the description, and claims appended thereto.

In the drawings, in which like parts are identified by the same reference numerals, Fig. 1 illustrates in block diagram, the general arrangement of components of a device employing the principles of the present invention.

Fig. 2 illustrates in block diagram certain components of an electronic timing relay of a type particularly adapted for use in the device of Fig. 1.

Fig. 3 shows in chart form, the sequence of operation of the various gates shown in Fig. 1.

Fig. 6A is a chart of the operation of the counting stages in the dash timing relay which is used in the device of Fig. 1.

Fig. 6B is a chart of the operation of the counting stages in the space timing relay which is used in the device of Fig. 1.

Use is made of electronic switch gates of the coincidence type wherein the gate may be capable of opening or closing a signalling or control path between other elements depending upon the coincidence of at least two electrical conditions applied to the gate.

Figure 4A:
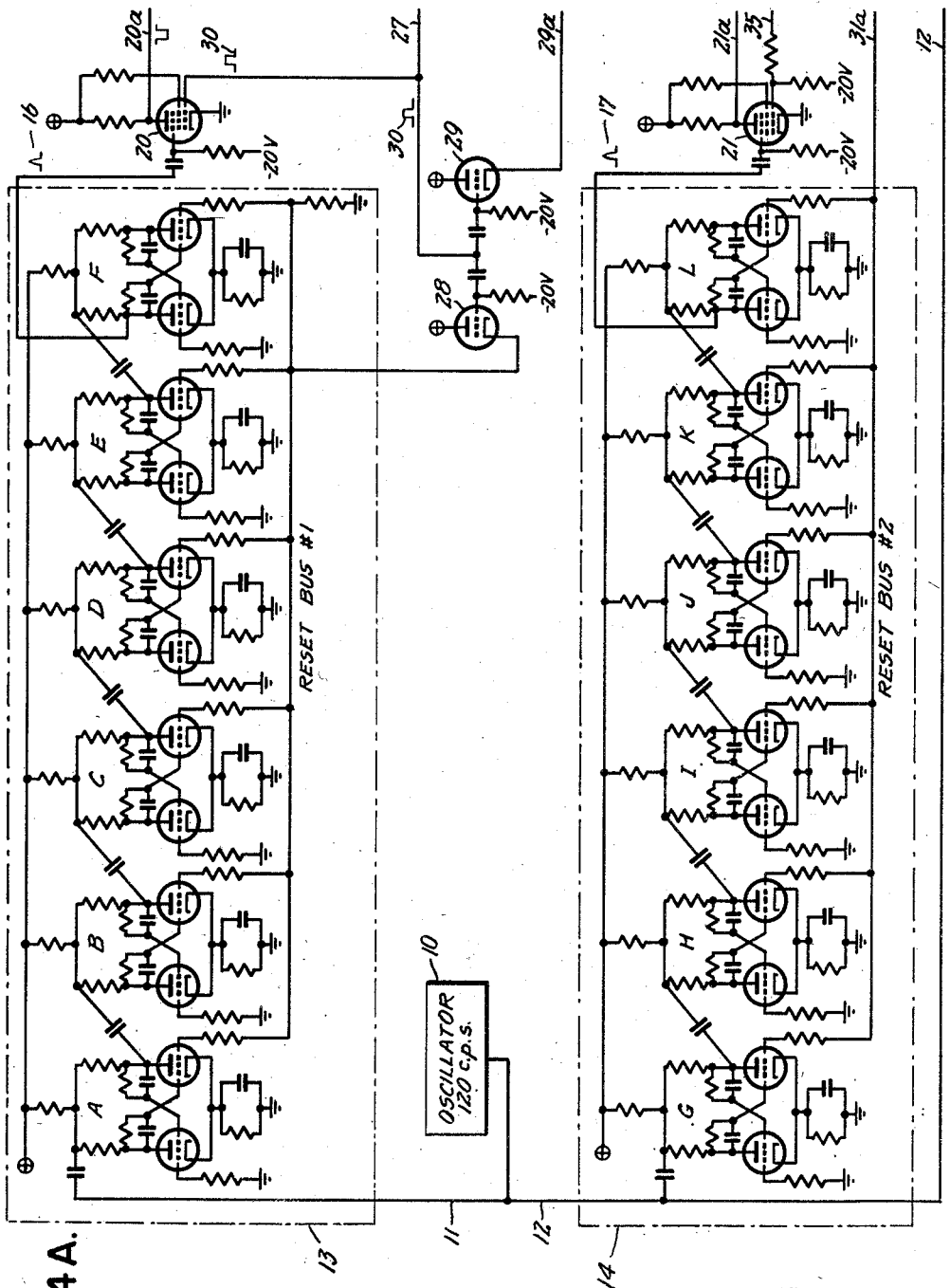
Figs. 4A, 4B and 4C are a schematic diagram of an embodiment of my invention.

Referring now to Fig. 1, a local pulse source 10 is connected by lines 11 and 12 to frequency dividers 13 and 14, respectively. Source 10 is adapted to deliver 128 negative pulses per second to lines 11 and 12, and is of a known type. Frequency dividers 13 and 14 respectively, consist of electronic counting chains, each stage of which is comprised of a pair of electron devices, shown in this specification, as electron discharge devices, arranged as multivibrator pairs, each stage capable of giving an output pulse for each two applied input pulses. The principle of operation of multivibrators is well known to those skilled in the art and need not be dwelt upon here. Selector key 40 comprises a bi-stable electronic stage and an inverter amplifier and is adapted to produce the following: (1) a positive output 30 on the onset of a received signal 22; (2) a positive output 60 upon the termination of received signal 22; (3) a positive output 38 during intervals between signals 22. Dash timing relay 23 is a modified binary counting chain and is selectively coupled to selector key 40, through an electronic gate 20, the selector key 40 being operable to produce an output dash 30 in response to a received dash signal 22 over conductor 44 from a radio receiver, of which only a portion of the second detector stage 69 is shown (Fig. 4c). Thus, gate 20 is adapted to be opened by the output dash 30 coinciding with received signal 22 and pulses 16 from the source 10 and divider 13 are permitted to pass through opened gate 20 to the input of dash timing relay 23. Dash timing relay 23 thereupon commences counting each pulse 16 and upon receipt of seven pulses 16, delivers a voltage capable of opening electronic gate 26 at a time 3.5 seconds after the onset of dash 30 and, upon receipt of a further number of pulses 16 totalling twelve in all, closes the gate 26 at a time 6.0 seconds after the onset of dash 30. Conductor 56 is coupled between selector key 40 and gate 26 and over which conductor a dash-off pulse 60 may be applied through the opened gate 26 to dash register 32. Dash register 32 consists of a conventional three-stage electronic binary counter and derives its input from selector key 40 via conductor 56 through opened gate 26.

I further provide a space timing relay 24, fed with pulses each half-second from pulse source 10 through frequency divider 14 via electronic gate 21. Space timing relay 24 is a modified binary counting chain and times the space intervals between received signals 22 and if the space between received signals equals or exceeds the predetermined time of 1.5 seconds, the space timer 24 delivers an output voltage which causes gate 34 to open. Gate 34 will permit erasure pulses derived from source 10 to pass to dash register 32 and thereby effect erasure of any dashes which were theretofore recorded thereon providing gate 37, disposed between source 10 and gate 34, was caused to be opened under control of selector key 40. There is further provided a conductive connection 31 coupling the output of gate 26 to the space timing relay 24 through a re-set gate 33 and to the frequency divider 14 through a re-set gate 33A, respectively.

The operation of the device will now be described with the aid of Figs. 4A, 4B and 4C.

The receipt of a signal at the second detector 69 of the receiver (Fig. 4C) results in a positive pulse 22 originating at the cathode of said second detector. This pulse is applied over conductor 44 to selector key 40 which comprises, in part, a pair of flip-flop tubes 40a and 40b which tubes have a common cathode connection and R. C. biasing network 40c. The biasing of the tubes is arranged so that tube 40b is normally conducting in the absence of any received signal 22. The positive voltage 22 is applied to the grid of tube 40a, causing it to conduct, whereupon, tube 40b cuts off thereby developing a positive pulse 30 at its anode. Pulse 30 is applied via gas discharge tube 40e to conductor 27 leading to gates 20, 28 and 29 (Fig. 4A). In the meantime, pulse source 10 has been applying negative pulses over conductor 11 to the input stage A of frequency divider 13. As will be seen from Fig. 4A, frequency divider 13 is a six (6) stage counting chain utilizing multivibrator pairs A . . . F and is adapted to deliver an output pulse for each sixty-four (64) input pulses applied from source 10. A positive pulse 16 is derived from the left-hand tube of stage F in divider 13 upon the receipt of a count of sixty-four (64) and is applied to the suppressor electrode of gate 20. If the positive pulse 30 (indicating the presence of a received signal 22) is directly applied to the control electrode of gate 20 coincidentally with pulse 16, gate 20 will open and a negative output pulse 20a will be derived from the anode of gate 20 to be applied to the input of stage M of dash timer 23 shown in Fig. 4B.

Dash timer 23 consists of a specialized pulse counter and utilizes a plurality of electronic devices arranged in pairs and shown connected as multivibrators. Dash timer 23 contains four (4) stages, M . . . P, each stage constituting a binary counter, the output of one stage feeding the input to the next successive stage. Dash timer 23 is similar to frequency divider 13 with the exception that there is an interlock or feed-back between stages O and M, and P and N, respectively. The interlocks or feed-back paths permit the realization of a timing device capable of initiating an output signal in response to a predetermined number of applied input pulses. The details of the operation of the timing relay are minutely explained in my co-pending application bearing Serial No. 254,122, filed October 31, 1951, entitled "Electron Timing Relay." The positive pulse 30 as stated before, is derived from the anode of tube 40b in selector key 40 as it cuts off. Pulse 30 is simultaneously applied from conductor 27 to the control electrode of re-set gate 29, which gate is normally closed, or cut off. Upon application of the positive pulse 30, gate 29 conducts and develops a positive voltage at its cathode, which voltage is applied to re-set bus number 1A of the dash timer 23 and causes each right-hand tube of stages M . . . S thereof to conduct thereby restoring dash timer 23 to its original condition. It should be noted that gate 29 is condenser-coupled to conductor 27, but that gate 20 is directly coupled to conductor 27. Thus, gate 20 will be primed to conduct as long as pulse 30 persists, but gate 29 will conduct but momentarily since the pulse 30 is differentiated over the R. C. network coupled to the control electrode of gate 29. To return to the operation of dash timer 23, negative pulse 20a will be applied each half-second to the input of stage M as long as gate 20 remains open; the gate 20 remaining open only during receipt of signals 22. The operation of dash timer 23 can be readily followed by referring to the chart contained in Fig. 6A. From an examination of the chart it will be seen that upon the receipt of the seventh pulse through the gate 20, the dash timer 23 will deliver a positive output pulse 25. The seventh pulse coincides with a time duration of 3.5 seconds after the onset of the received pulse 22 at receiver detector 69. It will thus be seen that any received signal 22 which is not at least of 3.5 seconds duration will not cause gate 26 to open because dash timer 23 will not deliver an output until the seventh received pulse from divider 13. The leading edge of pulse 25 derived from stage P of dash timer 23, is applied to the control electrode of gate 26 thereby conditioning it for coincidence operation by positive pulse 60 which will be received over conductor 56 from the anode of tube 40d in selector key 40 upon termination of received signal 22. Since tube 40b is normally conducting during the absence of received signals 22, the voltage at the anode thereof is low and tube 40d is therefore cut off. As a signal 22 is received, tube 40b cuts off and tube 40d will conduct delivering a negative pulse to conductor 56. Upon the termination of received signal 22, tube 40d will cut off and will thereupon apply the differentiated dash-off pulse 60 to the suppressor electrode of gate 26. If, at the moment of the application of pulse 60 to gate 26, stage P of dash timer 23 will have primed gate 26 by applying a positive voltage to the control electrode thereof, gate 26 will open and pass the pulse 60 to the input of dash register 32.

Figure 4B:
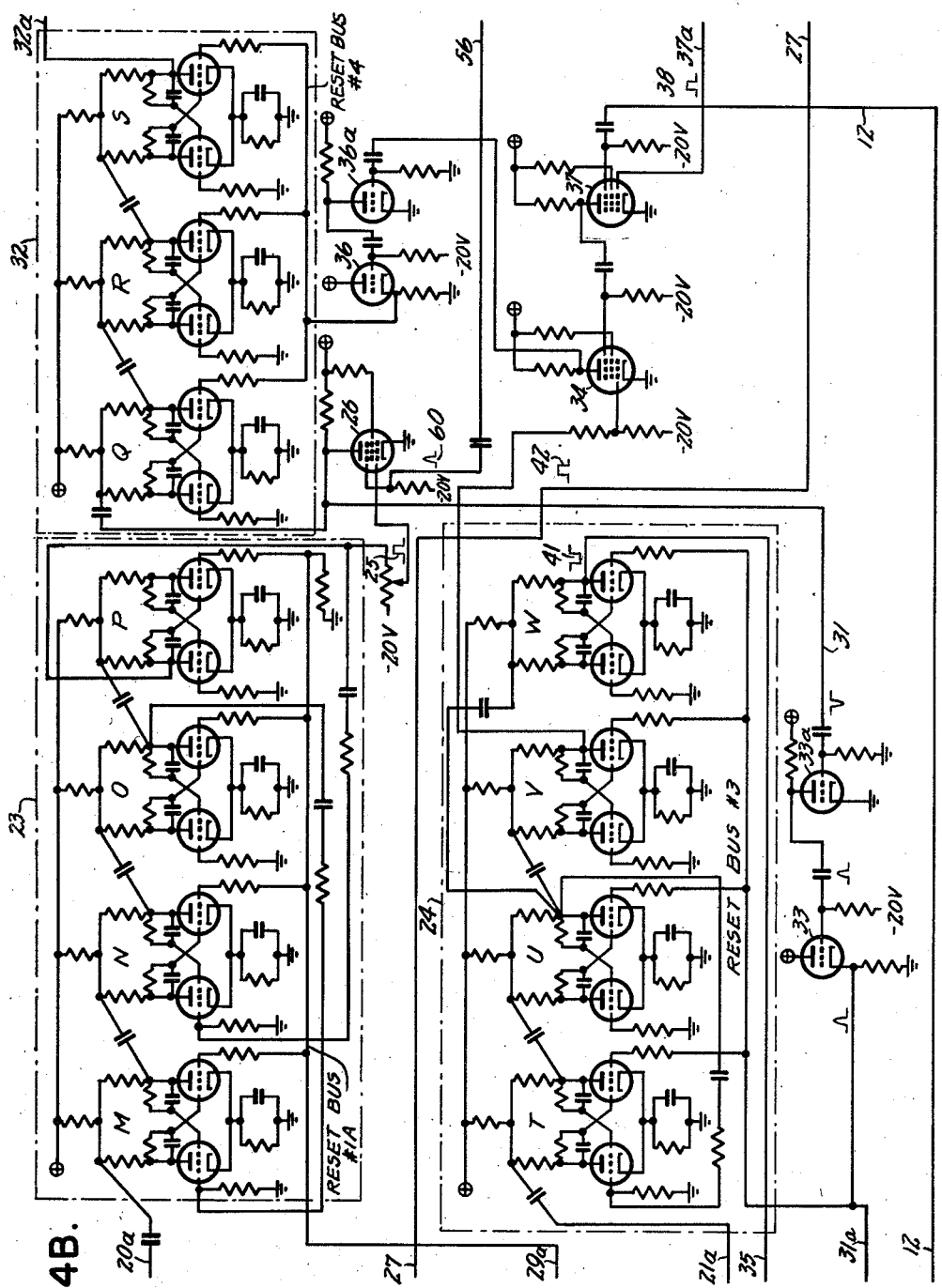
Figures 4C, 5:
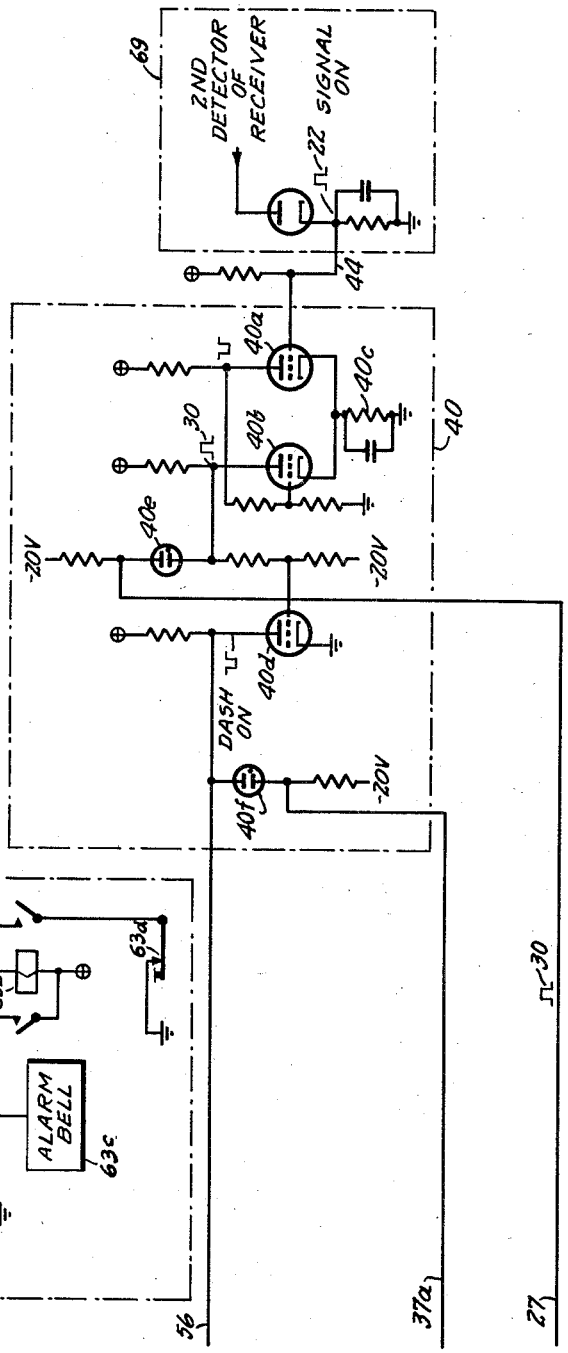
Fig. 5 shows how Figs. 4A, 4B and 4C should be placed side by side.

Dash register 32 is a three (3) stage binary counter similar to frequency divider 13 and consists of multivibrator stages Q, R and S. In all of the multivibrator stages utilized in this embodiment, the right-hand stage is assumed to be normally conducting. Thus, the application of a negative pulse from the anode of gate 26 upon the coincidence of pulses 25 and 60, causes one pulse (corresponding to an acceptable received dash 22) to be registered in register 32. Upon the receipt of four (4) pulses from gate 26, dash register 32 will deliver a positive output from the right-hand tube of its stage S over conductor 32a to the alarm device 63. Alarm device 63 comprises an electron discharge tube 63a, a relay 63b serially connected in the discharge path thereof, alarm bell 63c controlled by a contact of relay 63b and a manual re-set key 63d all connected in an obvious circuit. Tube 63a is normally biased to cut-off but upon application of a positive pulse from register 32, tube 63a will conduct and relay 63b will become energized and alarm bell 63c will sound. It will require manual operation of re-set 63d to open the holding circuit for relay 63b, since the right-hand contact of relay 63b closed the holding circuit therefor upon actuation thereof. The operation described thus far assumes the receipt of the proper number of dashes and having the proper duration, to wit, from 3.5 to 6 seconds and spaced less than 1.5 seconds apart. In the event that dashes of improper duration are received, or that the space between dashes of acceptable duration exceeds 1.5 seconds, any count registered on dash register 32 will be cancelled in the following manner:

If the received dash 22 is shorter in duration than 3.5 seconds, gate 26 will not have been opened since dash timer 23 delivered no output and the pulse 60 derived from the trailing edge of the pulse 22 received from the receiver detector 69, will not have been able to pass through the closed gate 26 and consequently, no pulse will be registered on register 32. The space timing relay 24 is adapted to time the intervals between dashes. The correct interval is less than 1.5 seconds and the space timing relay 24 exerts control over the dash register so that if the time period between acceptable dashes does not exceed 1.5 seconds, the dash register will continue to count. If the spacing between dashes exceeds 1.5 seconds, the space is too long and the dash count on the register will be erased by a pulse from the source 10. The erasure is achieved as follows:

The opening of gate 26 causes a negative pulse to be applied via conductor 31 to the grid of inverter tube 33a (Fig. 4B). Tube 33a is biased so as to be normally conducting. The negative pulse received over conductor 31 causes inverter tube 33a to cut off and a positive pulse is derived from the anode thereof and is applied to the control electrode of gate 33. Gate 33 which is normally cut off thereupon conducts and a positive potential is derived from the cathode thereof and is applied to conductor 31a as well as to re-set bus number 2, which re-sets frequency divider 14 so as to re-set same to the zero state or in condition to deliver a single output for each 64 pulses applied from source 10.

Frequency divider 14 is a duplicate of frequency divider 13 and consists of stages G . . . L. Output pulses 17 from the stage L is applied to the suppressor electrode of gate 21. Each time that tube 33 conducts, frequency divider 14 and space timer 24, respectively, are re-set to their initial condition, to wit, the right-hand tube of each stage will be caused to conduct. During the time that no pulse is received over conductor 31, pulses 17 from the divider 14 initiated in the source 10 and applied over conductor 12 to the G stage of the divider 14, will appear every half-second through gate 21 to the input of stage T of space timer 24. Stages T and U of space timer 24 are interlocked so that upon the receipt of the second pulse the condition of stage T is reversed. The operation of space timer 24 can be readily followed by referring to the chart contained in Fig. 6B. Upon the application of the third pulse 17 (corresponding to a time 1.5 seconds after the cessation of an acceptable signal 22) to the space timer 24, stage U triggers stages V and W simultaneously. The right-hand tube of stage V thereupon cuts off and applies a positive pulse 42 to the control electrode of gate 34 opening same. Stage W simultaneously applies a negative pulse 41 to the control electrode of gate 21 causing the gate to close. It will thus be seen that gate 34 opens 1.5 seconds following the termination of an acceptable dash 22 and remains open until a subsequently received dash 22 is accepted. Positive pulse 38 is derived from coupling to gas discharge tube 40f (Fig. 4C) and is applied to the control electrode of gate 37 via conductor 37a. Gas discharge tube 40f breaks down when tube 40d becomes non-conducting during the time that no signal is being received from the receiver detector 69. If gate 37 is open (no signal 22 being received) and if gate 34 is open, inverter tube 36a will be cut off thereby producing a positive pulse which is applied to the input of re-set tube 36 causing it to conduct and to apply a positive potential to re-set bus number 4 in the dash register 32. The application of a positive potential to the re-set bus 4 will cause the right-hand tubes of stages Q, R and S to conduct and any count stored in the register will be thereby erased. Thus, no output pulse from the stage S of dash register 32 will appear on conductor 32a nor will tube 63a be triggered. In effect therefore, an erasure of the register 32 will occur if a space between received dashes exceeds 1.5 seconds' duration. An erasure will also occur when a subsequent dash terminates while gate 26 is closed. If a dash is acceptable because of its duration and the spacing from the previous dash is proper, the register 32 will properly record and simultaneously space timer 24 will be re-set to its initial condition by the positive voltage applied to re-set bus #3 developed by the cathode of re-set tube 33. The re-setting of space timer 24 to zero closes gate 34 and again opens gate 21 readying the timer to receive a new group of divided-down pulses from source 10. This new group of pulses will time the subsequent interval between received dashes. If the subsequent dash is either too long or too short in duration, its termination will not be recorded on dash register 32 because coincidence will not occur at gate 26. Gate 34 will therefore be open and since gate 37 is open, an erasure of the dash register 32 will take place.

The ultimate aim of the device, to wit, the sounding of an alarm bell 63c will take place when four (4) dashes having a duration of from 3.5 to 6 seconds and separated by 1.5 second intervals have been received.

It will be noted that where a positive output is desired from any of the multivibrator stages utilized in the structure shown in Figs. 4A, 4B, 4C, a coupling is taken from the anode of the left-hand tube of the multivibrator pair and conversely, where a negative output is desired, a coupling is taken from the right-hand tube of the pair.

Pulse source 10 and frequency dividers 13 and 14 are merely illustrative of one particular timing circuit, it being understood that any other suitable timing circuit which is productive of a sequence of equally timed pulses might also be readily substituted therefor. It may be desirable to utilize separate oscillators to drive frequency dividers 13 and 14 respectively.

By referring to Fig. 3, one may readily follow the operation of the various gates utilized in my invention.

Gaseous discharge devices such as 40e and 40f serve as a visible indication of the proper operation of the selector key 40, and the failure of device 40e to extinguish between received signals 22 would indicate that tube 40b was not conducting and therefore the selector key was not in condition to receive a subsequent signal from receiver 69.

Summarizing the operation of the device, the following will be noted:

(a) A received dash of less than 3.5 seconds' duration will not be recorded because gate 26 cannot open until seven pulses from the divider 13 have been counted by dash timer 23, and this count requires 3.5 seconds.

(b) A received dash of longer than 6.0 seconds' duration will not be recorded because gate 26 will have been closed by the twelfth pulse received by the dash timer 23 from divider 13.

(c) A dash received more than 1.5 seconds after a previously received dash will not be recorded and will cause erasure of all previously registered dashes on the dash register 32 because space timer will have caused gate 34 to open upon a count of three, initiated upon the termination of a received signal 22, and gate 37 will have been opened by the termination of the received signal 22 thereby permitting a pulse from source 10 to re-set the register 32.

(d) A received dash of from 3.5 to 6.0 seconds' duration following a previously accepted and registered dash of a duration within the same limits, and having a spacing therefrom under 1.5 seconds, will be properly recorded, because no erasure pulse may pass through closed gate 37 when a received signal 22 is applied to selector key 40.

(e) Four acceptable received signals 22 will cause the alarm device 63 to operate.

While I have described above the principles of my invention in connection with specific apparatus, it is to be clearly understood that this description is made only by way of example and not as a limitation to the scope of my invention.

What is claimed is:

1. An automatic alarm device responsive to a predetermined sequence of received signal dashes of predetermined length separated by spaces of a definite length comprising signal receiving means, electronic switch means coupled to and adapted to be controlled by said receiving means, said switch means adapted to deliver a plurality of control potentials, dash register means for registering dash signals of said predetermined length, first electronic timing means for measuring minimum and maximum duration of acceptable received dash signals, second electronic timing means for measuring maximum duration of acceptable spaces between received acceptable dashes, a coincidence gate having an output coupled to said register means and said second timing means and having inputs connected to said first timing means and a first one of said control potentials, respectively, said first timing means coupled to a second one of said control potentials for co-joint control, register-cancelling means coupled between said second timer and said register, said last named means under the joint control of said second timer and a third one of said control potentials, whereby registration on said register means will be cancelled in the event of a space of longer duration during reception of said predetermined signal sequence.

2. In an automatic alarm device, register means adapted to record dashes of predetermined length and to be reset to zero reading by an erasure pulse upon receipt of dashes of non-acceptable length or spaces therebetween in excess of a maximum time duration, signal receiving means, electronic switch means coupled to said receiving means and adapted to be controlled thereby, said switch means adapted to deliver a plurality of control potentials in accordance with the character of signals received by said receiving means, a source of erasure pulses, a source of timing pulses, a pair of timing circuits responsive to a sequence of input timing pulses to produce time delayed output signals, means including a first one of said control potentials for initiating timing action of one of said timing circuits responsive to the reception of a signal dash by said selector circuit, means responsive to the termination of said received dash for initiating operation of said second timing circuit, a first gate connected between said registering means and said switch means and responsive to an output signal from said first timing circuit and said second control potential, said gate adapted to be gated open in time delayed relation to the start of an output signal from said first timing circuit, and to be gated closed a predetermined time interval thereafter, a second gate connected between said second timing circuit and said register means and adapted to be gated open a predetermined time interval after initiation of said second timing circuit in response to the termination of the received dash, a third gate connected between said switch means, said second gate, and said source of timing pulses, said third gate adapted to be gated open under control of said third control potential upon termination of a received dash and to be gated closed at the start of a subsequently received dash, whereby a received dash of less than or more than minimum length is prevented from actuating said register by the closed state of said first gate, while dashes of acceptable length find said first gate open and effect actuation of said register, said second gate being maintained closed during an interval corresponding to the maximum time period of an acceptable space to prevent an erasure pulse from erasing said register, and thereafter, opens said third gate being maintained open throughout all space intervals to permit, in cooperation with said second gate, the application of an erasure pulse to said register means in response to a space exceeding said maximum time interval.

3. The device of claim 1 wherein both said dash timing means and said space timing means include counting circuits operable in response to a predetermined number of timing pulses to actuate said associated gate respectively to a gate open state and a gate closed state, means for the initiation of a sequence of timing pulses, and gate means interposed between said timing pulse initiating means and said dash timing means and between said pulse timing means and said space timing means respectively, and means associated with said switch means and operative in response to a received pulse and to a received dash, respectively, for the initiation by a start and termination of a received dash of said corresponding dash timing means and said space timing means respectively.

4. In an electrical network, including means for deriving a plurality of control potentials from received signals comprising dashes and intervening spaces, a dash timing means, a space timing means, a dash register, a source of timing pulses, a warning signal coupled to said register, and a plurality of pulse responsive gates operatively associated therewith for actuation in response to an input signal comprising dashes and spaces introduced to said network for actuation of said dash register only in response to dashes of predetermined length and separated by spaces of predetermined intervals, and plural gates including a first gate disposed between said timing pulse source and said dash timing means in a manner to be gated open by application of a first one of said control potentials derived from the leading edge of an introduced dash and to be gated closed by the trailing edge of said dash and to remain closed during a subsequent space interval, a second gate connected between said timing pulse source and said space timing means in a manner to be gated open in response to the termination of an acceptable dash and gated closed by action of said space timing means a measured time interval after termination of an acceptable dash, a third gate connected between said dash timing means and said dash register in a manner to be gated open in response to a second one of said control potentials derived from a dash of minimum length and to be gated closed at the end of a measured time interval, a fourth gate connected between said space timing means and said dash register in a manner to be gated open by said space timing means after a measured time interval following termination of an acceptable dash and to be gated closed in response to termination of a subsequent dash, and a fifth gate connected between said timing pulse source and said fourth gate in a manner to be gated open by application of a third one of said control potentials derived upon termination of a dash and to remain open throughout space intervals and then to be gated closed upon removal of said third control potential throughout reception of subsequent dashes.

5. In a warning signal device, the combination including an oscillator, a first and second frequency divider connected thereto to deliver timed output pulses, a dash timing relay, a space timing relay, a first and second gating device, and means connecting said first gating device between said first frequency divider and said dash timing relay, and said second gating device between said space timing relay and said second frequency divider, respectively, an electronic switching circuit including an input for received signals comprising dashes and spaces, and including three output circuits, a first of which is permanently connected to said first gating device, the second and third output circuits being selectively responsive to an input dash and an input space respectively, said first mentioned circuit being productive of a square wave output in response to the rise and fall of an input dash, said second output circuit being productive of a differentiated pulse in response to the fall of an input dash, and said third output circuit being productive of a square wave in response to and proportional to a space, a dash register, a third gating device having its output coupled to said register, and its inputs coupled to the output of said dash timing relay, and said second output circuit respectively and adapted to be held open by a timed signal output from said dash timing relay in respect to a time base locked to the leading edge of a signal dash to permit an output pulse from said second output circuit to pass to said dash register for actuation thereof when in coincidence with the timed signal output from said dash timer, means connecting the input of said dash register to said space timing relay and to said second frequency divider for resetting thereof and opening of said second gate by a pulse initiated by termination of a dash passed through said third gating device, means connecting said space timer to said second gating eidvce to effect closing by a space timer output signal initiated by a sequence of timing pulses from said second frequency divider, fourth and fifth gates series connected between said oscillator and said dash register, means connecting said fourth gate to the third output circuit of said switch means for actuation thereof to an open state by a space initiated output signal, and means connecting said fifth gate to the output of said space timer relay for actuation thereof to an open state by a time delayed relay output signal initiated by a sequence of timing pulses from said second frequency divider.

6. The device of claim 5, wherein reset circuits are series connected respectively between said first output circuit and said first frequency divider and said dash timing relay, between said dash register input and said space timing relay and said second frequency divider, respectively, and between said fifth gating device and said dash timer.

7. The device of claim 5, including a warning device connected to the output circuit of said dash register for actuation by an output circuit of said dash register for actuation by an output pulse therefrom, said dash register being productive of a warning device actuating pulse in response to reception of a plurality of dashes passed thereto through said third gate, said dashes being separated by spaces of time intervals as to close said fifth gating device during open periods of said fourth gating device.

References Cited in the file of this patent

UNITED STATES PATENTS

| | | |
|---|---|---|
| 1,967,396 | Chauveau | July 24, 1934 |
| 2,235,804 | Macalpine | Mar. 18, 1941 |
| 2,418,521 | Morton et al. | Apr. 8, 1947 |
| 2,514,889 | McGoffin | July 11, 1950 |
| 2,533,765 | Chauveau | Dec. 12, 1950 |
| 2,761,060 | Bradley et al. | Aug. 28, 1956 |